United States Patent
Francis et al.

(10) Patent No.: US 12,326,259 B2
(45) Date of Patent: Jun. 10, 2025

(54) FUEL SWIRLER FOR PRESSURE FUEL NOZZLES

(71) Applicant: PRATT & WHITNEY CANADA CORP., Longueuil (CA)

(72) Inventors: Roger Antony Francis, Markham (CA); Nadia Swaby, York (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/102,638

(22) Filed: Nov. 24, 2020

(65) Prior Publication Data

US 2022/0163205 A1 May 26, 2022

(51) Int. Cl.
| | | |
|---|---|---|
| *F23R 3/00* | (2006.01) | |
| *F02C 7/232* | (2006.01) | |
| *F23R 3/28* | (2006.01) | |

(52) U.S. Cl.
CPC .............. *F23R 3/286* (2013.01); *F02C 7/232* (2013.01); *F05D 2220/32* (2013.01); *F05D 2230/60* (2013.01); *F05D 2240/35* (2013.01)

(58) Field of Classification Search
None
See application file for complete search history.

(56) References Cited

U.S. PATENT DOCUMENTS

| | | | | |
|---|---|---|---|---|
| 2,854,285 A | * | 9/1958 | Barton | ....................... F02C 3/10 239/430 |
| 4,134,606 A | | 1/1979 | Menti, Jr. | |
| 4,139,157 A | * | 2/1979 | Simmons | ................... F23R 3/28 239/404 |
| 4,798,330 A | * | 1/1989 | Mancini | ................... F23D 11/24 239/125 |
| 4,938,417 A | * | 7/1990 | Halvorsen | ............. F23D 11/107 60/741 |

(Continued)

FOREIGN PATENT DOCUMENTS

| | | |
|---|---|---|
| DE | 19535195 A1 | 3/1997 |
| DE | 10257809 A1 | 6/2004 |

(Continued)

OTHER PUBLICATIONS

European Search Report issued in application No. EP20173987 on Oct. 9, 2020.

(Continued)

*Primary Examiner* — Edwin Kang
(74) *Attorney, Agent, or Firm* — NORTON ROSE FULBRIGHT CANADA LLP

(57) ABSTRACT

A fuel swirler has a swirler housing defining an interior chamber having a fuel outlet at a downstream end. A swirler core is mounted inside the interior chamber. The swirler core has a downstream end portion with one or more fuel channels disposed thereon. The one or more fuel channels is in fluid communication with the fuel outlet. An internal bore extends longitudinally through the swirler core. The internal bore has an inlet connectable to a source of fuel. One or more exit holes fluidly connects the internal bore to the one or more fuel channels. An annular air gap is provided radially between the swirler housing and the swirler core for thermally shielding the internal bore.

15 Claims, 4 Drawing Sheets

(56) References Cited

U.S. PATENT DOCUMENTS

| | | | | |
|---|---|---|---|---|
| 5,697,553 | A * | 12/1997 | Stotts | F23D 11/383 |
| | | | | 239/406 |
| 6,357,222 | B1 * | 3/2002 | Schilling | F23D 11/38 |
| | | | | 60/800 |
| 6,547,163 | B1 | 4/2003 | Mansour et al. | |
| 7,360,363 | B2 | 4/2008 | Mandai et al. | |
| 2006/0096291 | A1 * | 5/2006 | Hebert | F23D 11/24 |
| | | | | 60/740 |
| 2007/0107434 | A1 * | 5/2007 | Prociw | F23R 3/283 |
| | | | | 60/740 |
| 2011/0289928 | A1 * | 12/2011 | Fox | F23R 3/286 |
| | | | | 60/740 |
| 2012/0058437 | A1 * | 3/2012 | Uhm | F23R 3/54 |
| | | | | 431/9 |
| 2012/0198812 | A1 * | 8/2012 | Uhm | F23R 3/286 |
| | | | | 60/39.463 |
| 2012/0292408 | A1 | 11/2012 | Short | |
| 2013/0081376 | A1 * | 4/2013 | Reynolds | F23R 7/00 |
| | | | | 60/247 |
| 2013/0283800 | A1 * | 10/2013 | Romig | F23R 3/06 |
| | | | | 60/733 |
| 2014/0260274 | A1 * | 9/2014 | Stoia | F02C 7/222 |
| | | | | 60/739 |
| 2014/0338356 | A1 * | 11/2014 | Keener | F23R 3/286 |
| | | | | 60/776 |
| 2015/0108236 | A1 * | 4/2015 | Buelow | F23R 3/286 |
| | | | | 239/5 |
| 2016/0003556 | A1 * | 1/2016 | Ott | F23R 3/283 |
| | | | | 165/177 |
| 2017/0363004 | A1 * | 12/2017 | Xu | F02C 7/12 |
| 2018/0135859 | A1 * | 5/2018 | Sadasivuni | F23R 3/14 |
| 2018/0298824 | A1 * | 10/2018 | Matsuyama | F23R 3/28 |
| 2018/0363907 | A1 * | 12/2018 | Purcell | F23D 11/38 |
| 2019/0011132 | A1 * | 1/2019 | Camponovo | F23R 3/34 |
| 2019/0309949 | A1 * | 10/2019 | Prociw | F02C 7/18 |
| 2019/0376690 | A1 * | 12/2019 | Niemeyer | F23R 3/286 |
| 2023/0167975 | A1 | 6/2023 | Hu | |
| 2023/0204213 | A1 | 6/2023 | Naik et al. | |
| 2024/0219029 | A1 | 7/2024 | Shershnyov | |

FOREIGN PATENT DOCUMENTS

| | | |
|---|---|---|
| EP | 633947 A | 12/1949 |
| EP | 2592351 A1 | 5/2013 |
| EP | 2965821 A1 | 1/2016 |
| WO | WO97/21958 A1 | 6/1997 |
| WO | WO00/19146 A2 | 4/2000 |
| WO | WO2005/061964 A1 | 7/2005 |
| WO | 20080024032 A1 | 2/2008 |

OTHER PUBLICATIONS

European Search Report issued in counterpart application 21210269.3 on Apr. 8, 2022.
European Search Report issued in counterpart application 23199900.4 on Jan. 24, 2024.

* cited by examiner

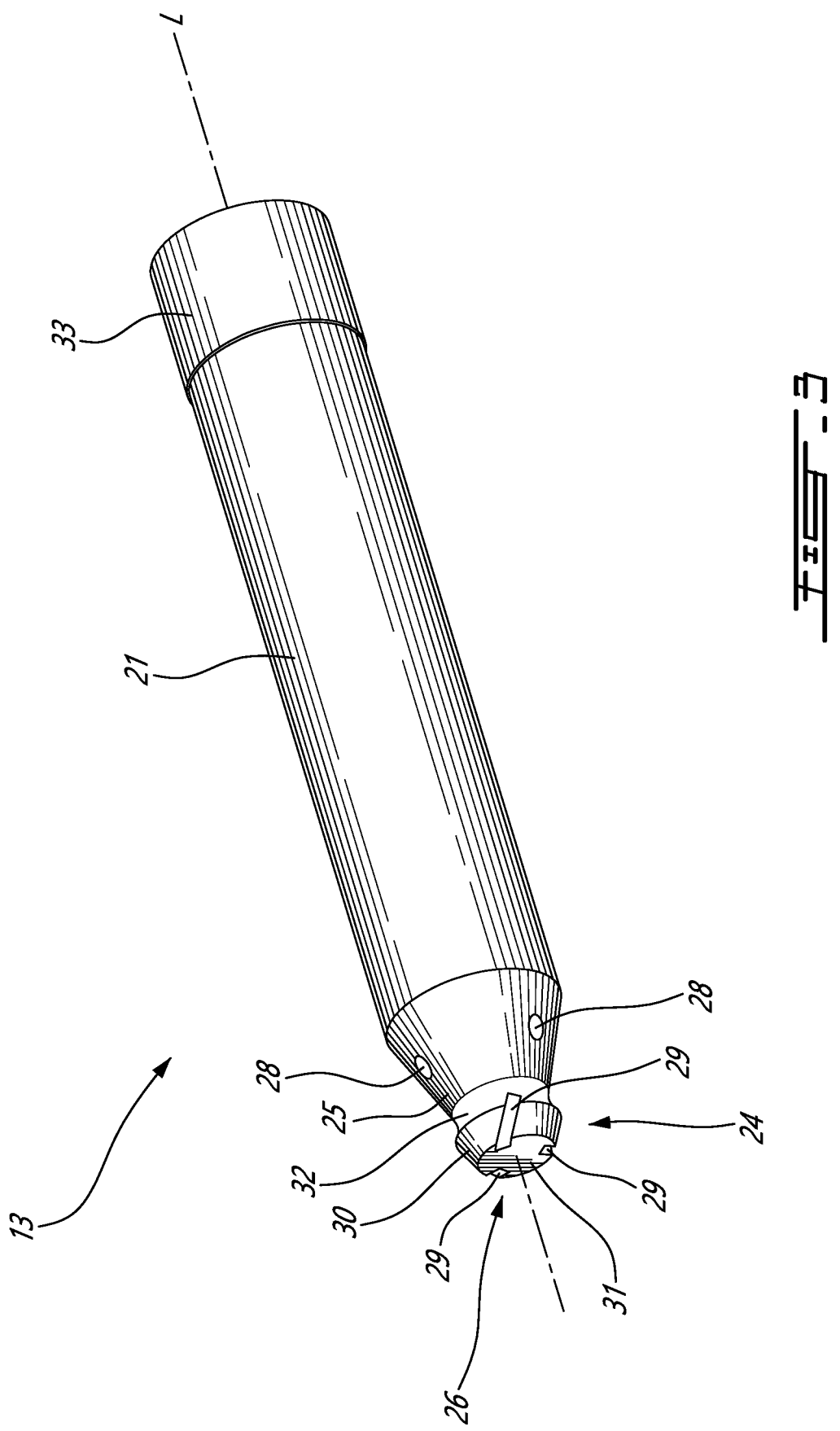

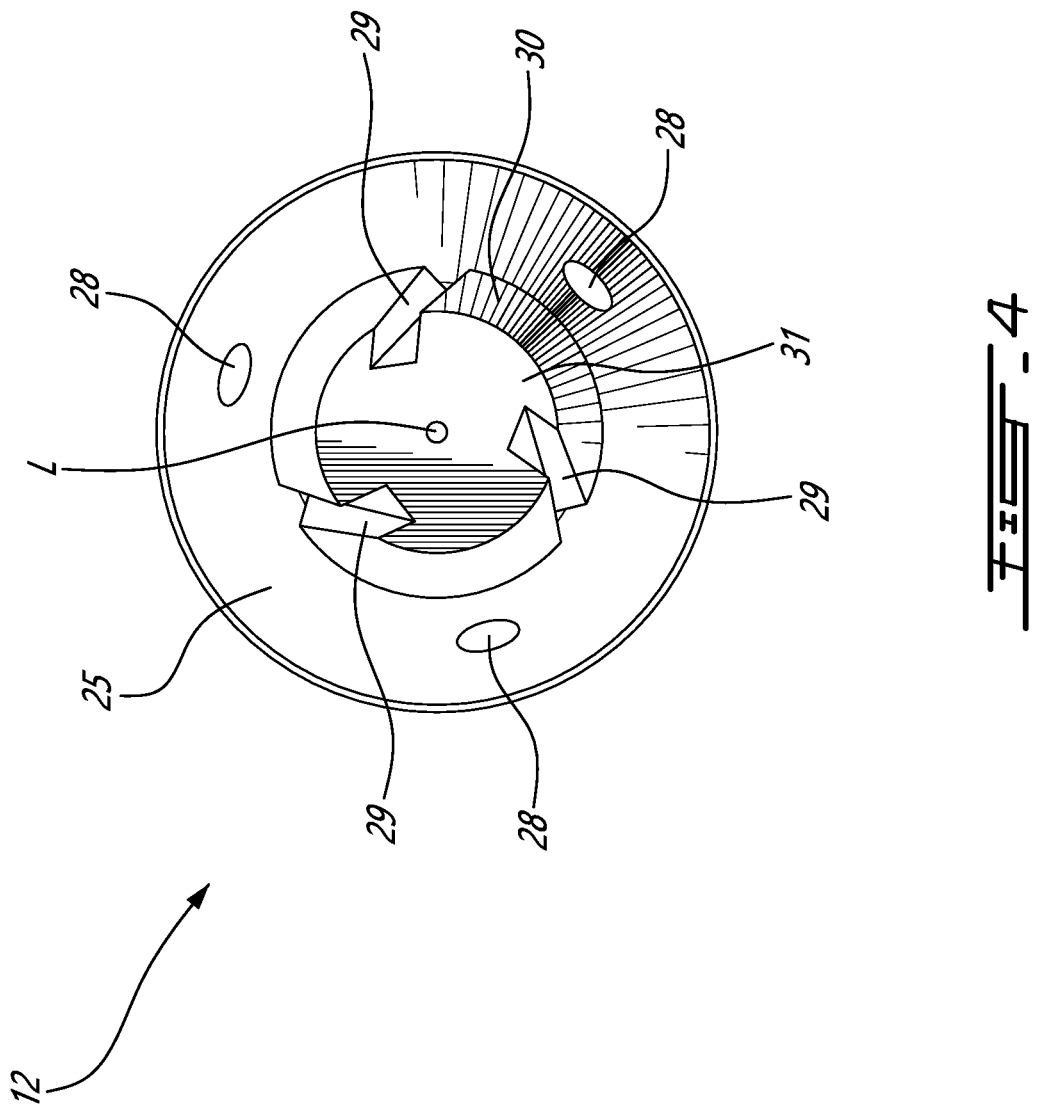

FUEL SWIRLER FOR PRESSURE FUEL NOZZLES

TECHNICAL FIELD

The disclosure relates generally to gas turbine engines and, more particularly, to a fuel swirler for a fuel nozzle.

BACKGROUND

Fuel nozzles are used for injecting fuel and air mixtures into the combustors of gas turbine engines. Compressed fuel is typically fed under pressure into a fuel nozzle and a surrounding array of pressurized air flow channels is provided to form an atomized air/fuel mixture.

The fuel nozzles may comprises a fuel swirler assembled from a swirler housing with an interior chamber and a swirler core that is press fit into the interior chamber of the swirler housing. The combined configuration of control surfaces between the swirler housing and swirler core define fuel flow channels and shaped surfaces. These channels and surfaces may control the direction, pressure and kinetic energy of the pressurized fuel flow to achieve a desired set of parameters for the fuel spray exiting the fuel outlet orifice.

In such fuel swirlers, the fuel typically travels through channels or grooves between the swirler core and the swirler housing. The proximity of the fuel to the outer surface of the fuel swirler may lead to undesirably high fuel temperatures, which may lead to issues such as fuel choking and a potential reduction of the fuel nozzle's life expectancy.

In addition, such typical swirler cores are often asymmetrically shaped to account for the outer fuel channels, for instance having features such as one or more flat portions on their exterior surface. This may lead to undesirable consequences such as bending and/or plastic deformation of the swirler core when inserted into the swirler housing, potentially blocking or restricting the flow of fuel through the channels or grooves.

SUMMARY

In one aspect, there is provided a fuel swirler for a gas turbine engine fuel nozzle, comprising: a swirler housing defining an interior chamber having a fuel outlet at a downstream end relative to a fuel flow direction through the fuel swirler; a swirler core mounted inside the interior chamber, the swirler core having a downstream end portion with one or more fuel channels disposed thereon, the one or more fuel channels in fluid communication with the fuel outlet, an internal bore extending longitudinally through the swirler core, the internal bore having an inlet connectable to a source of fuel, and one or more exit holes fluidly connecting the internal bore to the one or more fuel channels; and an annular air gap radially between the swirler housing and the swirler core for thermally shielding the internal bore.

In another aspect, there is provided a fuel swirler for a gas turbine engine fuel nozzle, comprising: a swirler housing defining an interior chamber extending from an opening at an upstream end relative to a fuel flow direction to a fuel outlet at a downstream end, the interior chamber defining a tapering transition portion axially disposed upstream of the fuel outlet and a socket portion upstream of the transition portion; and a swirler core receivable within the interior chamber of the swirler housing, the swirler core having a cylindrical shank portion and an end portion axially disposed downstream of the shank portion, the end portion having one or more fuel channels disposed thereon, the shank portion concentrically positionable within the socket portion and defining an air gap therebetween, the end portion engageable with the transition portion of the interior chamber, the swirler core defining an interior bore having a fuel inlet at an upstream end and one or more exit holes fluidly connecting the internal bore to the one or more fuel channels.

In a further aspect, there is provided a method of assembling a fuel swirler for a gas turbine engine, the fuel swirler including a swirler housing and a swirler core, the method comprising: inserting an end of the swirler core into an interior chamber of the swirler housing, an annular air gap forming between the swirler core and the swirler housing; abutting the inserted end of the swirler core against a transition portion of the interior chamber adjacent a fuel outlet in the swirler housing, the fuel outlet in fluid communication with an axial fuel path extending through an internal bore of the swirler core and through one or more exit holes fluidly connecting the internal bore to one or more fuel channels disposed in the inserted end of the swirler core; modulating the depth of the inserted end of the swirler core based on a desired engagement level between the transition portion and the one or more fuel channels; and fixing the swirler core to the swirler housing.

BRIEF DESCRIPTION OF THE DRAWINGS

Reference is now made to the accompanying figures in which:

FIG. 3 is an isometric view of a swirler core for the fuel swirler of FIG. 2; and FIG. 4 is a front view of the swirler core of FIG. 3.

DETAILED DESCRIPTION

Figure 1:
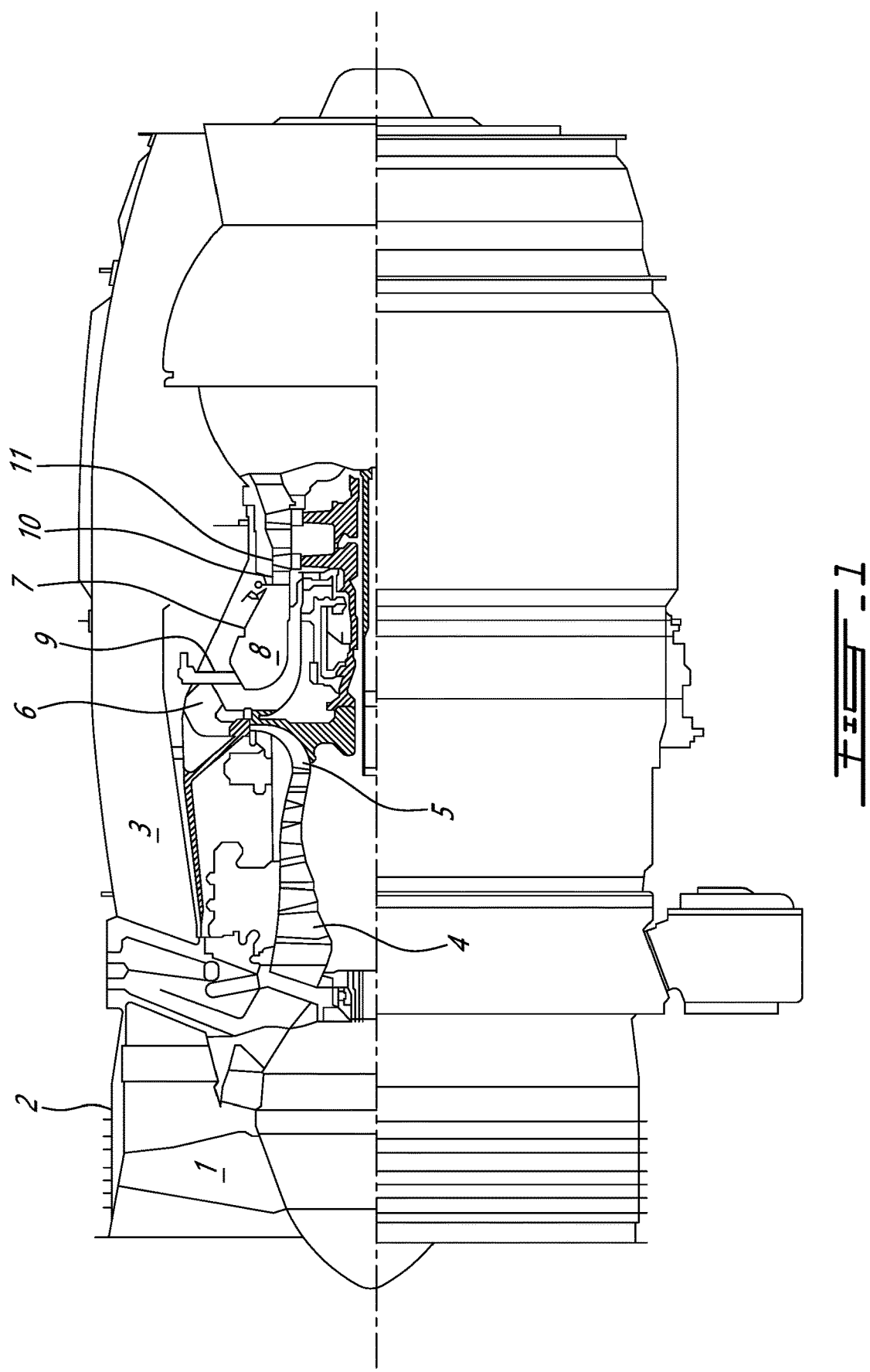
FIG. 1 is an axial cross-section view of an example gas turbine engine.

FIG. 1 shows an axial cross-section through an example gas turbine engine. While FIG. 1 illustratively shows a turbo-fan type gas turbine engine, it is understood that the present disclosure is applicable to other types of gas turbine aircraft engines as well. In the illustrated case, air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor 8 and pass over the nozzle guide vane 10 and turbines 11 before exiting the tail of the engine as exhaust.

As will be discussed in further detail below, the present disclosure is directed to fuel nozzles at the terminus of the fuel tubes 9 which direct an atomized fuel-air mixture into the combustor 8. A fuel nozzle includes a concentric array of compressed air orifices to create a swirling air flow surrounding a central fuel injecting swirler. The resultant shear forces between air and fuel cause the fuel and air mix together and form an atomized fuel-air mixture for combustion.

Figure 2:
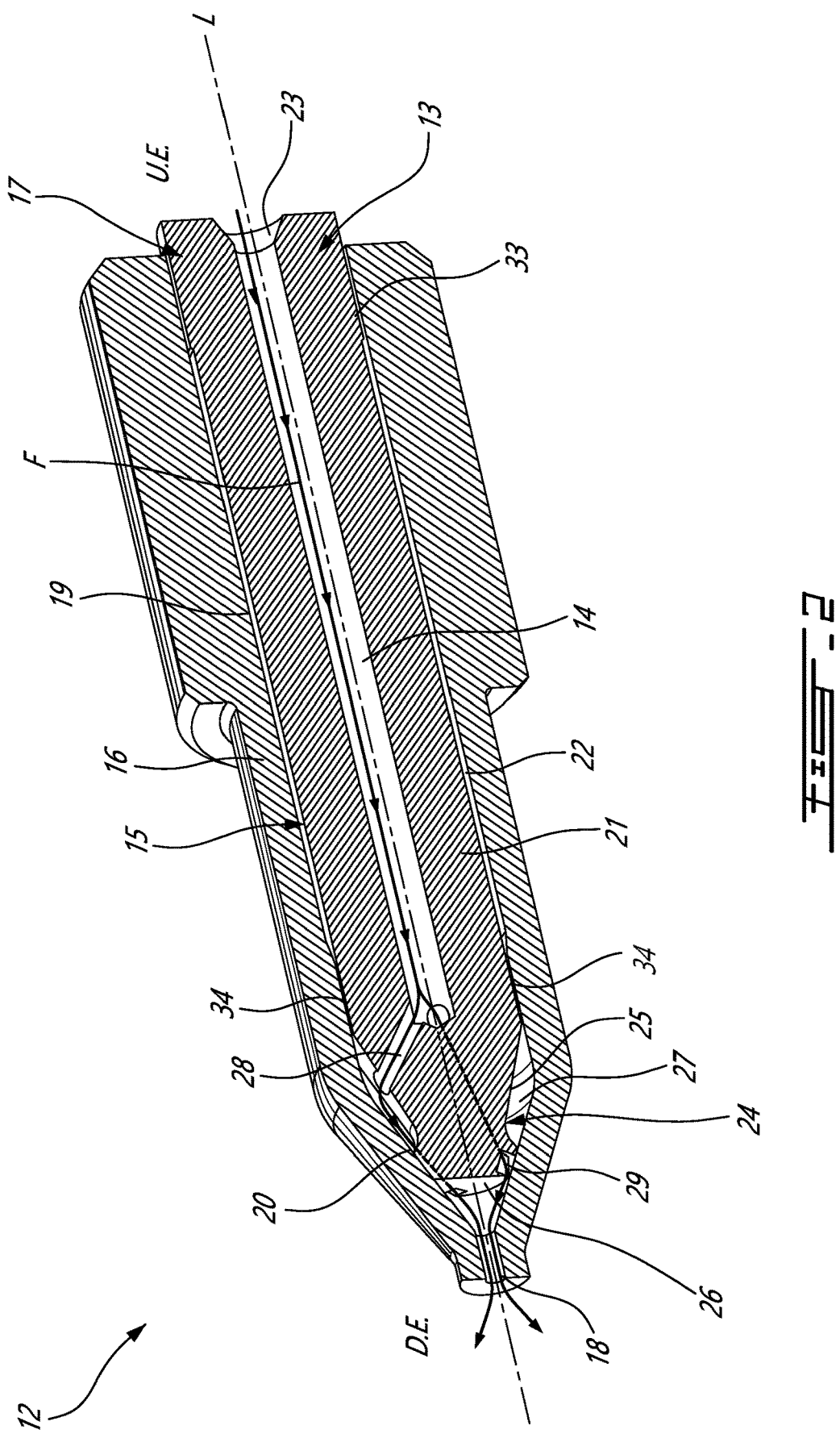
FIG. 2 is an isometric cross-section view of a fuel swirler according to an embodiment of the present disclosure.

FIG. 2 shows an isometric cross-section view of an exemplary embodiment of a fuel swirler 12 for a fuel nozzle. For simplicity, the outer components of the fuel nozzle that serve to direct compressed air are not shown. The fuel swirler 12 comprises a swirler core 13 having an internal bore 14 extending longitudinally through the swirler core 13 along a longitudinal axis L through which fuel is transported as will be discussed in further detail below. According to the illustrated embodiment the internal bore 14 is a central bore coaxial to the centerline of the swirler core. The swirler core 13 is axially mounted inside an interior chamber 15 of a swirler housing 16. The swirler core 13 is axially insertable through an opening 17 in the swirler housing 16 at an upstream end U.E. of the fuel swirler 12 relative to a fuel flow direction F. As will be discussed in further detail below, fuel from the swirler core 13 exits the fuel swirler 12 via a fuel outlet 18 at a downstream end D.E. of the fuel swirler 12. The interior chamber 15 includes a socket portion 19 downstream of the opening 17 and a transition portion 20 downstream of the socket portion 19 and upstream of the fuel outlet 18. In various cases, the outer surface of the swirler housing 16 is shaped to optimize the aerodynamic performance of the fuel swirler 12 in relation to the streams of compressed air while maintaining the required strength and structural integrity of the fuel swirler 12.

The swirler core 13 has a generally cylindrical exterior surface and includes a shank portion 21 concentrically positionable within the socket portion 19 of the interior chamber 15. An annular air channel or air gap 22 is formed radially between the exterior surface of the swirler core 13 and the bounding wall of the interior chamber 15 of the swirler housing 16. This air gap 22 may extend, for instance along the axial length of the shank portion 21. Such an air gap 22 may provide an added layer of thermal insulation for the flow of fuel F travelling internally through the swirler core 13. In various cases, the swirler core 13 and/or swirler housing 16 may be dimensioned to increase or decrease the thickness of the air gap 22 to vary the provided level of thermal insulation. Fuel may be provided to the internal bore 14 via a fuel inlet 23, receiving fuel from the fuel tubes 9. According to the illustrated embodiment, the fuel inlet 23 is provided at the upstream end of the swirler core 13 and is axially aligned with the internal bore 14.

Referring additionally to FIGS. 3 and 4, the swirler core 13 further includes a downstream end portion 24 abuttable against the wall of the transition portion 20 of the interior chamber 15. As will be discussed in further detail below, the level of engagement between the end portion 24 and the transition portion 20 may be chosen to meter or control the rate of fuel flow F exiting the fuel swirler 12 through fuel outlet 18. Illustratively, the end portion 24 includes a frustoconical portion 25 and a protruding tapered abutting portion 26 extending axially from the frustoconical portion 25. In the shown embodiment, as can be seen in FIG. 2, the frustoconical portion 25 begins to taper axially upstream of the transition portion 20 of the interior chamber 15, creating an annular fuel gallery 27. Fuel may exit the internal bore 14 of the swirler core 13 via one or more exit holes 28 disposed in the end portion 24, illustratively on the frustoconical portion 25. The exit holes 28 are fluidly connected to the fuel gallery 27 to direct the fuel passing through the internal bore 14 into the fuel gallery 27. While the shown swirler core 13 includes three exit holes 28, it is understood that more or less exit holes 28 may be provided depending on the desired fuel flow. In addition while the shown exit holes 28 are circular, other shaped holes may be contemplated as well. In the shown case, the exit holes 28 are formed into the swirler core 13 at an acute angle with the longitudinal axis L, for instance by being drilled or otherwise machined. The angle at which the exit hole(s) 28 are formed may vary, for instance, to increase or decrease the swirling effect provided to the exiting fuel.

The fuel swirler 12 further includes one or more spaced apart recessed fuel channels or slots 29 disposed in the end portion 24, illustratively on the abutting portion 26. In the shown embodiment, the abutting portion 26 includes a frustoconical sidewall 30 and a flat end face 31. Illustratively, the fuel channel(s) 29 begin at an annular recessed portion 32 of the end portion 24, extend the axial length of the sidewall 30 and open at the end face 31. The fuel channels 29 cooperate with the wall of the swirler housing 16 circumscribing the transition portion 20 to define metering passages for metering the flow of fuel from the fuel gallery 27. Other configurations for the end portion 24 may be contemplated as well.

Fuel exiting the internal bore 14 of the swirler core 13 through the exit hole(s) 28 is directed through the fuel channel(s) 29 towards the fuel outlet 18. The fuel travels through the one or more fuel channels 29 in a smaller, i.e. less voluminous, stream than in the internal bore 14, and as such is enabled to atomize into small droplets as it exits through the fuel outlet 18. The fuel exiting through the fuel outlet 18 in this atomized state, i.e. in small droplets, is combined with compressed air (not shown) and directed towards the combustor 8. In the shown case, three fuel channels 29 with square cross-sectional shapes are helically disposed about the abutting portion 26, although in other cases the number, cross-sectional shape and/or positioning about the abutting portion 26 may vary. For instance, while the illustrated fuel channels 29 are helically disposed about the abutting portion 26, in other cases the fuel channel(s) 29 may be axially disposed about the abutting portion 26, i.e. parallel to the longitudinal axis L. In addition, while the illustrated fuel channels 29 include square cross-sectional shapes, in other cases the cross-sectional shape of the fuel channel(s) 29 may be semi-circular or triangular. Other cross-sectional shapes may be contemplated as well.

The flow of fuel is best shown in FIG. 2 together with additional reference to FIGS. 3 and 4. Fuel under pressure enters via the fuel inlet 23 into the internal bore 14 of the swirler core 13. The fuel exits the internal bore 14 via the exit hole(s) 28 and is directed via the fuel gallery 27 through the fuel channel(s) 29 disposed in the end portion 24 towards the fuel outlet 18 and out of the fuel swirler 12. An axial fuel path is thus defined between the fuel inlet 23 and the fuel outlet 18.

In various embodiments, the number of exit holes 28 corresponds to the number of fuel channels 29. In some cases, the number of fuel channels 29 is a multiple of the number of exit holes 28. Illustratively, the end portion 24 includes three exit holes 28 and three fuel channels 29, although other numbers of exit holes 28 and/or fuel channels 29 may be considered. In an alternate embodiment, for instance, the end portion 24 may include two exit holes 28 and four fuel channels 29. Other numbers of exit holes 28 and fuel channels 29 may be contemplated as well. The exit of the holes 28 can be placed such that the fuel directly feeds into the fuel channels 29, or feeds in between the channels 29. In the exemplary embodiment shown in FIG. 4, the exit of the holes 28 are circumferentially in-between the channels 29. That is the "clocking" of the exit holes 28 is different from that of the channels 29.

In the shown case, the internal bore 14 is a central cylindrical bore along the longitudinal axis L through which fuel is transported, although other bore shapes and configurations may be contemplated as well. For instance, in some cases the internal bore 14 may be slightly offset from and parallel to the longitudinal axis L. In other cases, the swirler core 13 may alternatively include two or more internal bores 14 to transport the fuel. In various cases, the dimensions of the internal bore 14 and the exit hole(s) 28 are selected so that the flow of fuel through the swirler is metered by the fuel channel(s) 29. Stated differently, the swirler core 13 may be dimensioned so that the rate of fuel flow F through the internal bore 14 and the hole(s) 28 is greater than the allowable rate of fuel flow through the combined one or more fuel channel 29. For instance, the swirler core 13 may be dimensioned so that the cross-sectional area of the internal bore 14 is three times greater than the combined cross-sectional areas of the fuel channel(s) 29. In the illustrated case where the end portion 24 includes three fuel channels 29, each fuel channel 29 may allow a rate of fuel flow that is nine times less than the rate of fuel flow F through the internal bore 14. Other relative fuel flow rates may be contemplated as well. In various cases, when the cross-sectional area of the internal bore 14 is greater than the combined cross-sectional areas of the fuel channel(s) 29, the fuel channels 29 will be metering the flow of fuel F. In various cases, fuel exiting the internal bore 14 via exit holes 28 may accumulate in the fuel gallery 27 before passing through the fuel channel(s) 29.

As discussed above, the fuel swirler 12 may be assembled by inserting the swirler core 13 through the opening of the 17 of the swirler housing 16. In various embodiments, the rate of fuel flow F may be controlled based on the depth of insertion of the swirler core 13 into the interior chamber 15 of the swirler housing 16. By selectively pressing the abutting portion 26 against the transition portion 20 of the interior chamber 15, the fuel channel(s) 29 become increasingly covered or closed off due to the tapered profiles of the transition portion 20 and the frustoconical sidewall 30 of the abutting portion 26. As such, the rate of fuel flow F may be controlled. In various cases, the transition portion 20 and the frustoconical sidewall 30 may taper at different rates to alter the effect that the continued insertion of the swirler core 13 into the interior chamber 15 has on the rate of fuel flow F.

For instance, in an exemplary assembly process, the swirler core 13 is inserted into the interior chamber with the abutting portion 26 engaging the transition portion 20. Then, fuel is directed through the internal bore 14 via the fuel inlet 23, with the rate of fuel flow F exiting the fuel swirler 12 via the fuel outlet 18 is monitored, for instance via a flow meter (not shown). Then, the depth of the swirler core 13 within the interior chamber 15 is adjusted in either direction to modulate the exposed portion of the fuel channel(s) 29, i.e. the surface area through which fuel may exit from the fuel channel(s) 29, thus increasing or decreasing the rate of fuel flow F until a desired flow rate has been achieved. At such a point, the flow of fuel F may be stopped. As such, a desired level of engagement between the transition portion 20 and the abutting portion 26 may be selected to modulate the desired fuel flow rate. Other methods of achieving a desired fuel flow rate may be contemplated as well.

By assembling the fuel swirler 12 via the above-described method, the fuel channel(s) 29 may be manufactured into the end portion 24 with larger dimensions than required since their cross-sectional area is reduced as the swirler core 13 is inserted into the interior chamber 15. Such allowance may facilitate the overall manufacturing process of the fuel swirler, for instance by appeasing various manufacturing tolerances.

Once a desired flow rate has been achieved, the swirler core 13 is fixed to the swirler housing 16. In some cases, the swirler core 13 and swirler housing 16 may be fixed together through a brazing process. For instance, a thin layer of gold paste (not shown) is applied to a shoulder 33 of the swirler core 13 before its insertion into the swirler housing 16. Once a desired flow rate has been achieved, the fuel swirler 12 may be heated, for instance in a furnace, to solidify the gold paste into an adhesive. Such an adhesive may maintain the swirler core 13 at the previously-selected depth for a desired flow rate and affix the swirler core 13 and swirler housing 16 together, readying the fuel swirler 12 for use. Other methods of fixing the swirler core 13 to the swirler housing 16 may be contemplated as well, for instance through various welding processes.

In the shown case, the interior chamber 15 of the swirler housing 16 includes a radially thicker portion 34, illustratively at the downstream end of the socket portion 19. This thicker portion 34 decreases the diameter of the interior chamber 15, adding a level of resistance when inserting the swirler core 13 into the interior chamber 15. This added resistance may facilitate the above-described method of metering the flow of fuel, for instance by offering more control of the depth of the swirler core 13 to the user. The thickness of the thicker portion 34 may be selected based on the desired level of resistance against the inserted swirler core 13, among other considerations. In addition, in various cases the thicker portion 34 may provide a barrier between the air gap 22 and the annular fuel gallery 27 when the swirler core 13 is inserted in the interior chamber 15, preventing the fuel in the fuel gallery 27 and the air in the air gap 22 from undesirably mixing.

In various embodiments, at least various portions of the swirler core 13 and/or swirler housing 16 are axisymmetric about the longitudinal axis L. In the shown case, for instance, the shank portion 21 of the swirler core 13 is axisymmetric about the longitudinal axis L. As such, when the swirler core 13 is inserted into the swirler housing 16 and abutted against the transition portion 20, the shank portion 21 will resist against bending, plastically deforming or otherwise undesirably distorting. An axisymmetric swirler core 13 under axial force will have balanced compressive axial stresses radially across the uniform cross-sectional area of the swirler core 13. There is no force imbalance to create non-elastic bending, buckling or lateral distortion since the axisymmetric cross-section provides an axisymmetric distribution of stress.

In the shown case, both the swirler core 13 and the swirler housing 16 are axisymmetric about the longitudinal axis L. As such, the air gap 22 may be consistently maintained about the circumference of the swirler core 13. This provides a consistent layer of thermal insulation to the flow of fuel F throughout the internal bore 14, ensuring the fuel temperature is maintained at a low enough temperature based on the given engine's requirements. In addition, by directing the fuel flow F through the internal bore 14 of the swirler core 13 rather than between the swirler core 13 and the swirler housing 16, as is typically the case, the temperature of the fuel is further reduced, which in some cases may extend the life expectancy of the fuel nozzle. For instance, in various cases the fuel nozzles in a given gas turbine engine are surrounded by various sources of heat, so the placement of the axial fuel path through the internal bore 14 of the swirler core 13 provides the greatest possible separation between the fuel and such sources of heat.

In such axisymmetric cases, any number of exit holes 28 in excess of one and fuel channels 29 in excess of one can be arranged in a circumferentially spaced apart array that results in an axisymmetric cross-section. For instance, FIG. 4 shows three exit holes 28 and three fuel channels 29, but two or more exit holes and/or two or more fuel channels 29 can be axisymmetrically distributed with reference to the longitudinal axis L in other manners as well.

Various manufacturing processes may be utilized to produce the swirler core 13 and swirler housing 16. Traditional manufacturing and removal techniques using machines such as lathes and mills may be implemented. Other manufacturing techniques such as additive manufacturing and metal injection moulding may be contemplated as well. As discussed above, various brazing or welding procedures may be utilized to fix the swirler core 13 to the swirler housing 16.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel swirler for a gas turbine engine fuel nozzle, comprising:
    a swirler housing defining an interior chamber having a fuel outlet at a downstream end relative to a fuel flow direction through the fuel swirler;
    a swirler core mounted inside the interior chamber, the swirler core having a downstream end portion with one or more fuel channels disposed thereon, the one or more fuel channels in fluid communication with the fuel outlet, an internal bore extending longitudinally through the swirler core, the internal bore having an inlet connectable to a source of fuel, and one or more exit holes fluidly connecting the internal bore to the one or more fuel channels, the one or more fuel channels beginning at one or more fuel channel inlets disposed downstream of the one or more exit holes; and
    an annular air gap radially between the swirler housing and the swirler core for thermally shielding the internal bore, the annular air gap fluidly sealed from the fuel outlet at the downstream end of the swirler housing to fluidly disconnect the annular air gap from the fuel outlet, the annular air gap extending along an axial length of the swirler core;
    wherein the downstream end portion of the swirler core includes a frustoconical portion through which the one or more exit holes pass and a tapered abutting portion which the one or more fuel channels are disposed within, the tapered abutting portion having a maximum diameter that is greater than a minimum diameter of the frustoconical portion;
    wherein the frustoconical portion tapers linearly from a maximum diameter of the frustoconical portion to the minimum diameter of the frustoconical portion.

2. The fuel swirler as defined in claim 1, wherein the one or more fuel channels include a number of the one or more fuel channels that is a multiple of a number of the one or more exit holes.

3. The fuel swirler as defined in claim 1, wherein the swirler core has a central axis, and wherein the swirler core is axisymmetric about the central axis.

4. The fuel swirler as defined in claim 1, wherein a cross-sectional area of the internal bore is greater than a combined cross-sectional area of the one or more fuel channels.

5. The fuel swirler as defined in claim 4, wherein the downstream end portion of the swirler core is engageable with a tapered transition portion of the interior chamber to regulate a rate of fuel flowable through the one or more fuel channels.

6. The fuel swirler as defined in claim 1, wherein the internal bore is a central cylindrical bore axially disposed along a central axis of the swirler core.

7. The fuel swirler as defined in claim 1, wherein the one or more fuel channels are disposed helically about the downstream end portion of the swirler core.

8. The fuel swirler as defined in claim 1, further comprising an annular fuel gallery disposed radially between the swirler housing and the swirler core, the annular fuel gallery disposed between the one or exit holes and the one or more fuel channel inlets relative a swirler core central axis, the annular fuel gallery in fluid communication with the one or exit holes and the one or more fuel channel inlets.

9. A fuel swirler for a gas turbine engine fuel nozzle, comprising:
    a swirler housing defining a radially outer surface and a radially inner surface defining an interior chamber extending from an opening at an upstream end relative to a fuel flow direction to a fuel outlet at a downstream end, the interior chamber defining a tapering transition portion axially disposed upstream of the fuel outlet and a socket portion upstream of the tapering transition portion;
    a swirler core receivable within the interior chamber of the swirler housing, the swirler core having a cylindrical shank portion and an end portion axially disposed downstream of the cylindrical shank portion, the end portion having one or more fuel channels disposed thereon, the cylindrical shank portion concentrically positionable within the socket portion and defining an annular air gap therebetween, the end portion engageable with the tapering transition portion of the interior chamber, the swirler core defining an internal bore having a fuel inlet at an upstream end and one or more exit holes fluidly connecting the internal bore to the one or more fuel channels, the one or more fuel channels beginning at one or more fuel channel inlets disposed downstream of the one or more exit holes; and
    the annular air gap radially between the swirler housing and the swirler core for thermally shielding the internal bore, the annular air gap fluidly sealed from the fuel outlet at the downstream end of the swirler housing to fluidly disconnect the annular air gap from the fuel outlet, the annular air gap extending along an axial length of the cylindrical shank portion;
    wherein the end portion of the swirler core includes a frustoconical portion through which the one or more exit holes pass and a tapered abutting portion which the one or more fuel channels are disposed within, the tapered abutting portion having a maximum diameter that is greater than a minimum diameter of the frustoconical portion;
    wherein the frustoconical portion tapers linearly from a maximum diameter of the frustoconical portion to the minimum diameter of the frustoconical portion.

10. The fuel swirler as defined in claim 9, wherein the one or more fuel channels include a number of the one or more fuel channels that is a multiple of a number of the one or more exit holes.

11. The fuel swirler as defined in claim 9, wherein the one or more fuel channels have a square-shape cross-section.

12. The fuel swirler as defined in claim 9, wherein a cross-sectional area of the internal bore is greater than a combined cross-sectional area of the one or more fuel channels.

13. The fuel swirler as defined in claim 9, wherein the internal bore is a central cylindrical bore axially disposed along a central axis of the swirler core.

14. The fuel swirler as defined in claim 13, wherein the swirler core is axisymmetric about the central axis thereof.

15. The fuel swirler as defined in claim 9, further comprising an annular fuel gallery disposed radially between the swirler housing and the swirler core, the annular fuel gallery disposed between the one or exit holes and the one or more fuel channel inlets relative a swirler core central axis, the annular fuel gallery in fluid communication with the one or exit holes and the one or more fuel channel inlets.

\* \* \* \* \*